(12) United States Patent
Postolaki

(10) Patent No.: US 12,408,252 B1
(45) Date of Patent: Sep. 2, 2025

(54) SEQUENTIAL MOTION-RESPONSIVE MODULAR LIGHTING SYSTEM WITH DIRECTIONAL COMMUNICATION AND LOW-POWER OPERATION

(71) Applicant: Radu Postolaki, Dayton, MN (US)

(72) Inventor: Radu Postolaki, Dayton, MN (US)

(73) Assignee: Radu Postolaki, Dayton, MN (US)

( * ) Notice: Subject to any disclaimer, the term of this patent is extended or adjusted under 35 U.S.C. 154(b) by 0 days.

(21) Appl. No.: 19/204,529

(22) Filed: May 10, 2025

(51) Int. Cl.
| | | |
|---|---|---|
| *H05B 45/30* | (2020.01) | |
| *H05B 45/325* | (2020.01) | |
| *H05B 47/11* | (2020.01) | |
| *H05B 47/13* | (2020.01) | |
| *H05B 47/16* | (2020.01) | |

(52) U.S. Cl.
CPC ........... *H05B 47/13* (2020.01); *H05B 45/325* (2020.01); *H05B 47/11* (2020.01); *H05B 47/16* (2020.01)

(58) Field of Classification Search
CPC ...... H05B 45/10; H05B 45/30; H05B 45/325; H05B 47/10; H05B 47/11; H05B 47/13; H05B 47/16
See application file for complete search history.

(56) References Cited

U.S. PATENT DOCUMENTS

| | | | |
|---|---|---|---|
| 2015/0002028 A1* | 1/2015 | Chen | H05B 45/44 |
| | | | 315/153 |
| 2021/0112647 A1* | 4/2021 | Coleman | H05B 47/1985 |

\* cited by examiner

*Primary Examiner* — Jimmy T Vu

(57) ABSTRACT

A modular, motion-activated LED lighting system for sequential illumination in architectural pathways such as staircases and hallways. Each self-contained module includes a microcontroller, motion sensor, ambient light sensor, main and warning LEDs, and battery power. The system utilizes pulse-code modulated (PCM) infrared (IR) signals for directional communication between modules. Upon detecting motion, a module triggers a cascading lighting sequence. DIP switches enable module ID assignment, while integrated ambient light sensing and battery monitoring ensure energy efficiency. The system's low-power, scalable design is adaptable for smart integration and commercial applications.

17 Claims, 2 Drawing Sheets

SEQUENTIAL MOTION-RESPONSIVE MODULAR LIGHTING SYSTEM WITH DIRECTIONAL COMMUNICATION AND LOW-POWER OPERATION

BACKGROUND OF THE INVENTION

Various modular and motion-activated lighting systems exist in the prior art. For example:

- U.S. Patent Application US20100201267A1 discloses a motion-responsive lighting system for indoor spaces but does not integrate addressable, sequential activation among distributed modules.
- U.S. Pat. No. 9,642,217 teaches the use of infrared-based motion sensor networks but lacks modular standalone operation and binary-configurable identification mechanisms.
- U.S. Pat. No. 10,842,895 describes modular germicidal lighting triggered by motion; however, it does not provide sequential communication logic between modules for directional lighting.
- U.S. Pat. No. 10,299,336 describes DIP switch configurable lighting, but without motion-responsive, sequential illumination or intelligent power management.
- U.S. Patent Application US20090051523A1 illustrates sequential lighting patterns, primarily for vehicular signaling, and does not address architectural motion-triggered lighting for path illumination.

While aspects of sensing, modular construction, and sequential lighting are individually disclosed in the prior art, none of these references teach or suggest the specific and novel combination of:

- Pulse-code modulated (PCM) infrared communication for directional signaling,
- Binary-configurable module identifiers using DIP switches with internal pull-up resistors,
- Energy-efficient operation through low-power microcontroller modes,
- Ambient light sensing to inhibit unnecessary activation,
- Sequential entry-aware activation and deactivation along a chain of wireless modules,
- And optional expansion to radio frequency (RF) communication for future embodiments.

The present invention uniquely integrates these features to enable a scalable, intelligent, modular lighting system optimized for motion-responsive architectural applications.

SUMMARY OF THE INVENTION

The present invention provides a modular, energy-efficient, motion-activated lighting system for sequential illumination in architectural pathways. Each self-contained lighting module includes a battery-powered microcontroller, a motion sensor, an ambient light sensor, a main LED array, a warning indicator LED, and wireless communication components.

Modules communicate with one another using infrared signals encoded via pulse-code modulation (PCM), with each module assigned a unique identifier through a DIP switch array connected to GPIO pins with internal pull-up resistors enabled. Module identifiers are used both for individual identification and for determining sequential activation order within the chain.

Upon detecting motion under low-light conditions, a module transmits a wake-up pulse and a PCM-encoded message containing its ID and chain address. Receiving modules activate their main LEDs in sequence, remaining on for a programmable ON-time duration before dimming and deactivating via PWM.

Microcontroller operation is optimized for low power consumption, entering a low-power mode during periods of inactivity and waking upon detection of motion or an incoming communication signal. Battery voltage is continuously monitored, triggering visual alerts and protective shutdowns when thresholds are crossed.

The system's modular, tool-less design enables flexible deployment and easy replacement without requiring rewiring or reconfiguration. Future embodiments may incorporate radio frequency (RF) communication and smart platform integration for expanded functionality.

DETAILED DESCRIPTION OF THE INVENTION

Figure 1:
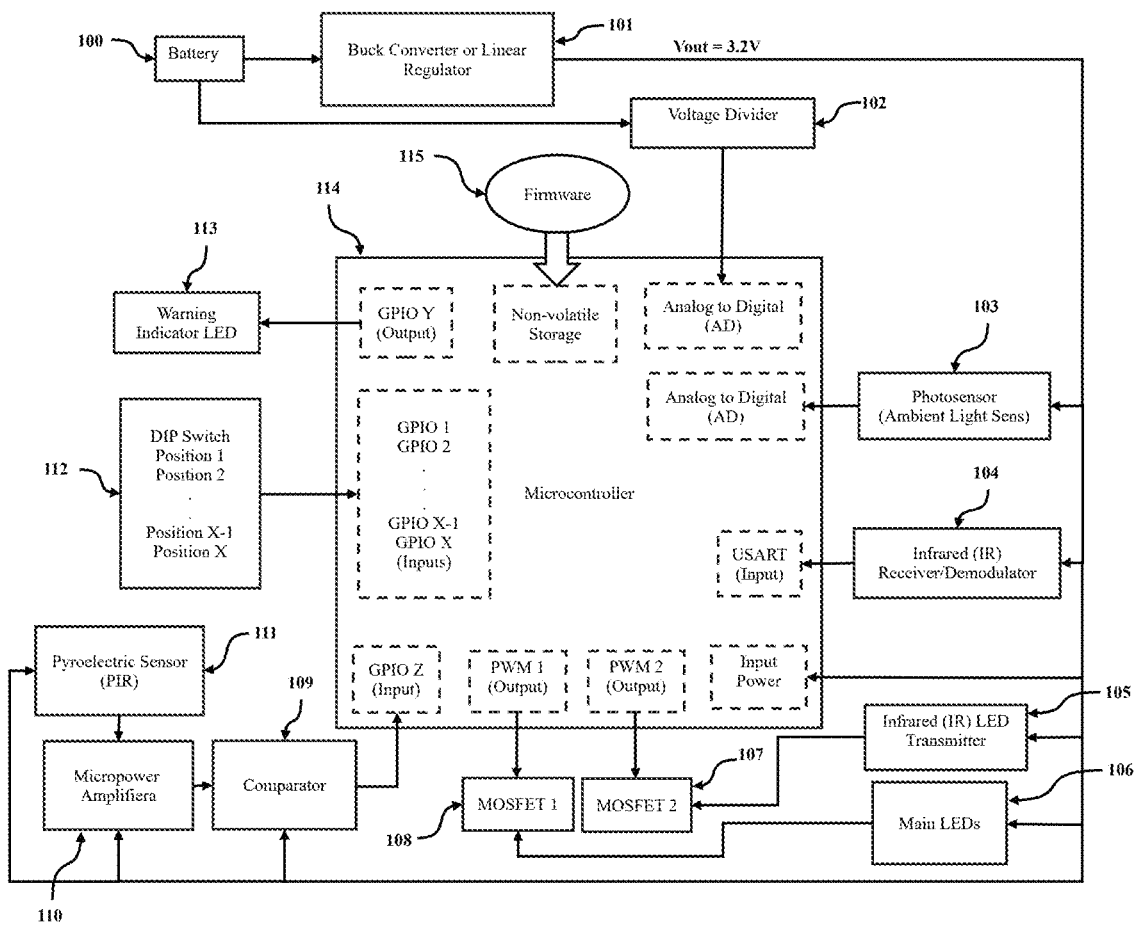
FIG. 1 is a block diagram of an individual modular lighting unit, showing the microcontroller, motion and ambient sensors, LED drivers, infrared communication components, and battery power management system.

Referring to FIG. 1, the present invention discloses a modular, motion-activated lighting system comprising a plurality of intelligent, self-contained LED lighting modules. Each module operates independently or as part of a wirelessly networked chain and is suitable for deployment in staircases, hallways, and other transitional environments.

Each lighting module includes an ultra-low-power microcontroller (114), powered by an internal battery (100), which manages system logic, sensor processing, and communication control. The microcontroller enters a low-power sleep mode during periods of inactivity and is configured to wake upon detection of motion or receipt of a valid infrared (IR) signal. A power management subsystem consisting of a buck converter or linear regulator (101) provides voltage regulation, while a voltage divider (102) scales battery voltage for monitoring via the microcontroller's analog-to-digital converter (ADC).

Ambient light levels are detected using an analog photosensor (103), enabling the microcontroller to inhibit lighting activation during daytime or adequate lighting conditions. The microcontroller compares the sensed value against a predefined ambient light threshold stored in firmware.

Motion detection is achieved via a pyroelectric infrared (PIR) sensor (111). Its analog output is amplified by a micropower amplifier (110), which allows for continuous low-power operation, and is digitized by a comparator (109), producing an edge-detectable signal that triggers a GPIO wake-up interrupt on the microcontroller. This event initiates activation of the lighting logic from the low-power sleep mode.

Main LED illumination is provided by an array of high-efficiency LEDs (106), powered through a MOSFET (108) under PWM (pulse-width modulation) control from the microcontroller. This allows brightness to be smoothly increased and decreased to conserve power and improve user experience. A separate warning indicator LED (113) is controlled by a digital output pin and used to alert the user of low or critical battery levels.

Wireless communication between modules is achieved using infrared transmission. The IR transmitter (105) is driven by a second MOSFET (107) and controlled via the microcontroller to send PCM-encoded digital messages. Each communication sequence begins with a wake-up pulse, followed by a short delay, and then a message frame containing the module's unique ID and chain address. These messages are generated using pulse-code modulation (PCM), encoded by the firmware and emitted through the IR LED.

The IR receiver (104) demodulates incoming IR signals and provides digital output to a shared GPIO pin. Upon detecting the wake-up pulse, the microcontroller wakes from low-power mode and reconfigures the GPIO pin as a USART input to receive the incoming serial communication message. If the received address and module ID match the expected parameters, the module joins the lighting sequence.

Modules are assigned unique identifiers via a DIP switch array (112) connected to designated microcontroller GPIO pins. Each DIP switch is connected to a designated GPIO pin of the microcontroller with the internal pull-up resistor enabled, such that a closed switch produces a logic low and an open switch produces a logic high, allowing binary assignment of a unique module ID and determination of sequential order within the communication chain Sequential lighting logic ensures that activation propagates from the triggering module outward in a direction-sensitive manner. After a fixed ON-time duration—configurable in firmware—each module dims and deactivates its LED array using PWM, following the same order as activation.

Battery health is continuously monitored. If voltage drops below a first threshold, the warning LED (113) briefly flashes. If the voltage falls below a second, critical threshold, the microcontroller disables the main LED array (106) to preserve battery life, while still allowing for communication and minimal alert signaling.

Figure 2:
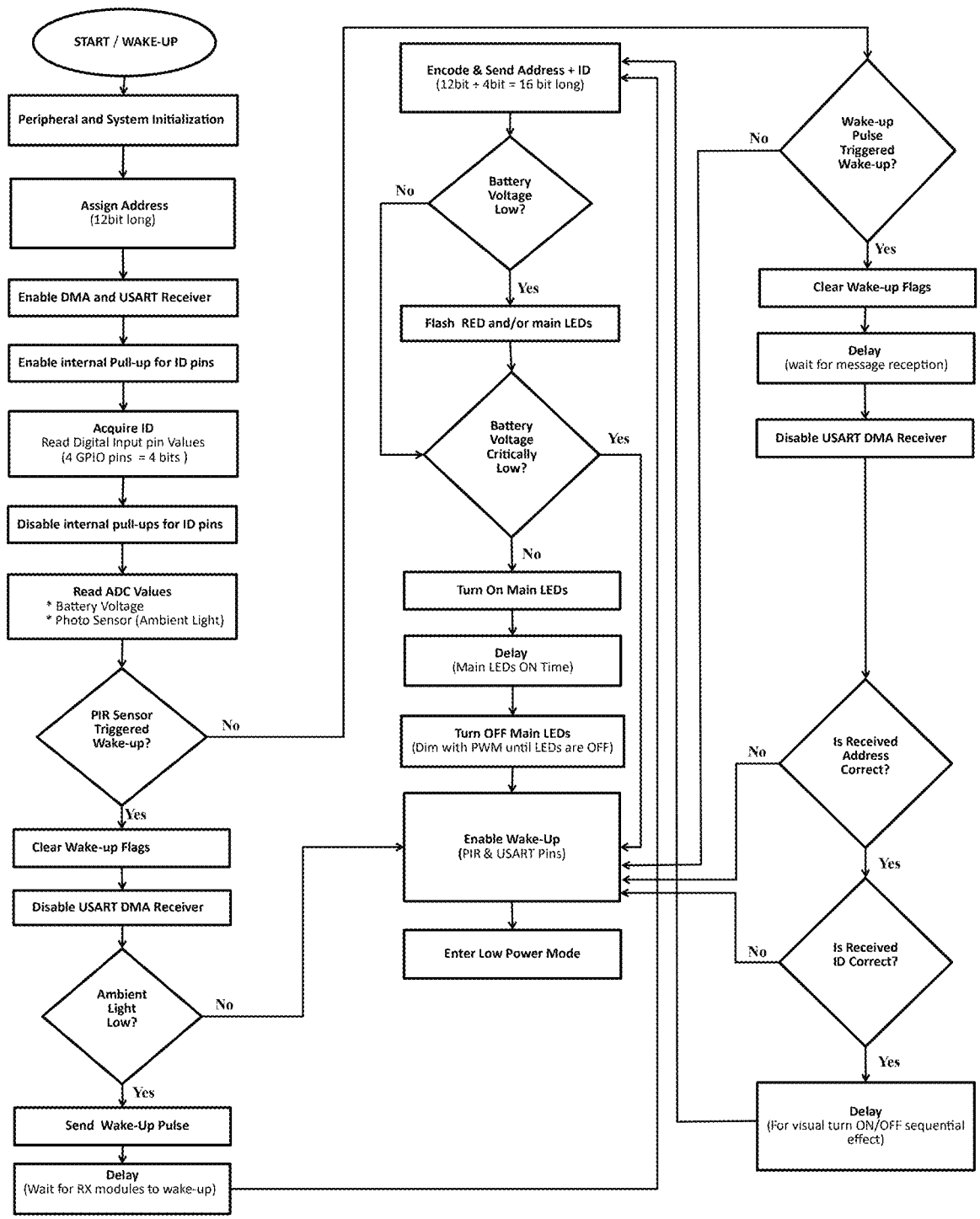
FIG. 2 is a flowchart illustrating the firmware operation of a lighting module, including ambient light sensing, motion detection, communication signaling, LED activation via PWM, and low-power mode transitions.

FIG. 2 illustrates the firmware's operational logic using a system-level flowchart, while FIG. 3 (if included) may present a representative circuit schematic for illustrative support. Future embodiments may adopt RF-based communication or integration with smart home platforms for remote configurability, monitoring, and scheduling.

This design provides an energy-efficient, direction-aware, modular lighting system utilizing micropower hardware, intelligent firmware, and seamless infrared communication, offering significant improvements over conventional systems described in prior art such as U.S. Pat. No. 9,642,217, US20100201267A1, and U.S. Pat. No. 10,842,895.

What is claimed is:
1. A modular lighting system comprising
a plurality of lighting modules, wherein each lighting module comprises:
   a battery-powered microcontroller;
   a battery-voltage-monitoring circuit configured to measure a voltage level of a battery that powers the lighting module;
   a motion sensor;
   an ambient light sensor;
   a main light-emitting-diode (LED) array and a warning indicator LED;
   an infrared (IR) transmitter and an IR receiver;
   a universal synchronous/asynchronous receiver-transmitter (USART) interface; and
   at least one general-purpose input/output (GPIO) pin;
wherein each lighting module is configured to:
   (a) monitor ambient light levels using the ambient light sensor;
   (b) detect motion using the motion sensor;
   (c) upon detecting motion while ambient light is below a predefined threshold, transmit a wake-up pulse via the IR transmitter;
   (d) after transmitting the wake-up pulse, transmit a pulse-code-modulated (PCM) signal via the IR transmitter, the PCM signal including the lighting module's unique identification and chain address information;
   (e) measure the battery voltage using the battery-voltage-monitoring circuit and compare the measured value to at least one predefined threshold;
   (f) activate the main LED array of the same lighting module using pulse-width modulation (PWM) for a defined predefined ON-time duration when the measured battery voltage is above the minimum operating threshold; and
   (g) after the ON-time duration expires, deactivate the main LED array of the same lighting module by dimming the LED array using PWM after the ON-time duration expires.

2. The modular lighting system of claim 1, wherein the microcontroller operates in a low-power mode during periods of inactivity and is activated upon receiving a wake-up signal from the IR receiver or a motion detection event.

3. The modular lighting system of claim 1, wherein the IR receiver detects modulated infrared signals encoded via pulse-code modulation (PCM), demodulates them into serial data, and outputs the serial data to a microcontroller USART input.

4. The modular lighting system of claim 1, wherein the microcontroller reconfigures a GPIO pin used for wake-up detection as a USART input to receive serial data from the IR receiver after a wake-up event.

5. The modular lighting system of claim 1, wherein the system initiates a directional lighting sequence based on the module that detects motion and sequentially activates other modules in the direction of travel.

6. The modular lighting system of claim 1, wherein each module determines a unique module ID via a DIP switch array connected to microcontroller GPIO pins with internal pull-up resistors enabled, such that each closed switch produces a logic low and each open switch produces a logic high, the module ID being used both for identification and for determining the module's sequential position within the communication chain, wherein communication signals include a chain address identifying the group of modules.

7. The modular lighting system of claim 1, wherein battery voltage is scaled through a voltage divider and monitored via the microcontroller's analog-to-digital converter.

8. The modular lighting system of claim 7, wherein the warning indicator LED is activated if the battery voltage falls below a first threshold.

9. The modular lighting system of claim 7, wherein the main LED array is disabled if the battery voltage falls below a second, lower threshold.

10. The modular lighting system of claim 1, wherein motion sensors are placed on terminal modules in a chain configuration to enable detection of entry from either direction.

11. The modular lighting system of claim 1, wherein module-to-module communication is achieved via radio frequency (RF) signaling instead of infrared (IR).

12. The modular lighting system of claim 1, wherein each lighting module is fully modular, allowing tool-less removal and replacement without requiring physical connectors, rewiring, or reconfiguration.

13. A method for operating a microcontroller in a modular lighting module, the method comprising: monitoring ambient light conditions using an analog photosensor; detecting motion using a pyroelectric sensor; determining whether ambient light is below a defined threshold; upon detecting motion under low-light conditions, transmitting a wake-up pulse via an infrared (IR) transmitter; transmitting a PCM-encoded IR message containing module identification and chain address information; activating a main LED array using pulse-width modulation (PWM) for a programmable ON-time duration; and dimming and deactivating the main LED array after the ON-time duration.

14. The method of claim 13, further comprising: receiving a demodulated serial communication from an IR receiver by using a universal synchronous/asynchronous receiver-transmitter (USART) interface; and determining whether to activate the main LED array based on the received module ID and chain address.

15. The method of claim 13, further comprising: reading DIP switch array configuration upon startup or wake-up to assign a unique module ID.

16. The method of claim 13, further comprising: reconfiguring a general-purpose input/output (GPIO) pin used for wake-up signal detection as a universal synchronous/asynchronous receiver-transmitter (USART) input after microcontroller activation.

17. The method of claim 13, further comprising: scaling battery voltage through a voltage divider; sampling the scaled voltage using an analog-to-digital converter; activating a warning LED if the voltage falls below a first threshold; and disabling the main LED array if the voltage falls below a second, lower threshold.

* * * * *